(12) United States Patent
Lukich et al.

(10) Patent No.: US 6,427,741 B1
(45) Date of Patent: Aug. 6, 2002

(54) AIRCRAFT TIRE

(75) Inventors: Lewis Timothy Lukich, Akron; Thomas Andrew Dwenger, Uniontown; John Robert McGilvrey, Ravenna, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/445,864

(22) PCT Filed: Jul. 27, 1997

(86) PCT No.: PCT/US97/13193
§ 371 (c)(1),
(2), (4) Date: Dec. 13, 1999

(87) PCT Pub. No.: WO99/04989
PCT Pub. Date: Feb. 4, 1999

(51) Int. Cl.⁷ ................................................. B60C 1/00
(52) U.S. Cl. ........................................ 152/537; 152/526
(58) Field of Search .............................. 152/526, 527, 152/451, 561, 565, 547, 546, 548, 537; 57/236, 237, 241, 242, 243, 252; 524/499, 495; 525/241, 242, 332.6, 332.7

(56) References Cited

U.S. PATENT DOCUMENTS

| | | | |
|---|---|---|---|
| 3,583,463 A | * 6/1971 | O'Neil | 152/361 |
| 3,929,180 A | 12/1975 | Kawase et al. | 152/359 |
| 4,893,665 A | * 1/1990 | Reuter et al. | 152/451 |
| 5,067,538 A | * 11/1991 | Nelson et al. | 152/451 |
| 5,221,382 A | 6/1993 | Sid-Ahmed | 152/451 |
| 5,223,061 A | * 6/1993 | Navaux | 152/527 |
| 5,623,007 A | 4/1997 | Kuebler | 524/105 |
| 5,744,552 A | * 4/1998 | D'Sidocky et al. | 525/332.6 |
| 5,855,704 A | * 1/1999 | Reuter | 152/527 |

FOREIGN PATENT DOCUMENTS

| | | | | |
|---|---|---|---|---|
| EP | 0385033 A1 | 12/1989 | | C08L/21/00 |
| EP | 0629652 A1 | 6/1994 | | C08J/5/10 |
| EP | 0677546 A1 | 3/1995 | | C08J/5/10 |

* cited by examiner

*Primary Examiner*—Edward J. Cain
*Assistant Examiner*—Katarzyna W. Lee
(74) *Attorney, Agent, or Firm*—David E. Wheeler

(57) ABSTRACT

A pneumatic aircraft tire has carcass plies and/or breaker plies which are reinforced by high modulus reinforcement cords embedded in a rubber composition that contains no free amines and has a 300% modulus of 12–18 MPa and a minimum tensile strength of 23 MPa as tested per ASTM D412, and a T90 of between 30 and 40 minutes at a reference temperature of 135 degrees C. as tested per ASTM D2084. The cords in the carcass plies and/or breaker plies have a tenacity of 6.6 to 8.2 g/denier, an initial modulus of 120 to 280 g/denier, an elongation at break of 8 to 18% and a shrinkage of not greater than 3%. Polyester reinforcement cords are preferred.

8 Claims, 4 Drawing Sheets

AIRCRAFT TIRE

TECHNICAL FIELD

The present invention relates to a pneumatic tire reinforced with high modulus cords which is suitable for use on an aircraft.

BACKGROUND ART

It is generally recognized in the tire art that tires suitable for use on aircraft must be capable of operating under conditions of very high speeds and large loads as compared to tires used on automobiles, busses, trucks or similar earthbound vehicles. Tires used on earthbound vehicles undergo millions of flexes (rotations) during their lifetime under loads that fall in a relatively small range. Aircraft tires are subjected to high centrifugal forces and large loads on takeoff and high sudden impact stresses (including a high G-force) and loads during landing. An aircraft tire undergoes relatively few flexes (compared to earthbound tires) during its lifetime. As used herein and in the claims, a tire is "suitable for use on an aircraft" if the tire is of a size and load range, or ply rating, specified in either the "Yearbook of the Tire and Rim Association", or the "Yearbook of the European Tyre and Rim Technical Organization," or in the current U.S.A. military specification "MIL-T-5041". In the prior-art, in order to meet the required ratings, aircraft tires were made using a large number of carcass plies and breaker plies having a high e.p.i. count of multifilament cords, usually nylon, as reinforcement. Nylon is a preferred reinforcement material for aircraft tires since it is fatigue resistant and is otherwise more forgiving than other types of reinforcement materials, and is compatible with the high heat tolerant rubber compounds needed for use in aircraft tires. Nylon reinforcement materials, however, melt at a relatively low temperature and soften at normal aircraft tire operating temperatures, which makes a tire made with nylon reinforcement subject to flatspotting. Also, it is because nylon does not have the strength of other types of reinforcement materials that the large number of plies discussed above are needed to build aircraft tires.

Although higher modulus materials that melt at a higher temperature than nylon, such as polyesters, would make a tire more resistant to flatspotting, and possibly lighter weight, high modulus materials have not been generally considered to be broadly useful reinforcement material in aircraft tires since they appear to have low compatibility with the high temperature stable rubber compounds that are most frequently used in aircraft tires.

DESCRIPTION OF THE INVENTION

Summary of the Invention

The present invention relates to a pneumatic tire suitable for use on an aircraft. The tire comprises (a) at least a pair of axially spaced substantially inextensible beads, (b) carcass plies wrapped over the beads, (c) breaker plies disposed radially outward of the carcass plies in a crown portion of the tire. The carcass plies and the breaker plies comprise substantially parallel high modulus cords imbedded in a rubber compound having the formula

| Rubber | 100 |
| --- | --- |
| Carbon Black | 40–60 |
| Processing oil | 3–10 |
| Fatty Acid | 1–3 |
| Zinc Oxide | 3–8 |
| Sulfur | 0.5–2.5 |
| accelerator | 1–3 |
| Adhesion promoter | 1–7 | wherein ingredients are listed in parts by weight per hundred parts by weight rubber, and the compound contains no free amines. Promoters for the rubber compound are selected from the group consisting of resorcinol, hexamethylenetetramine, hexamethoxymethylmelamine and reactive phenol-formaldehyde resin and the accelerator may be non-amine generating and is selected from the group consisting of sulfenamide accelerators or benzothiazole accelerators. The high modulus cords have a tenacity of 6.6 to 8.2 g/denier, an initial modulus of 120 to is 280 g/denier, an elongation at break of 8 to 18% and a shrinkage of not greater than 3%. The high modulus cords of the breaker plies are embedded in the rubber compound at an end count of 6 to 28 e.p.i.

In accordance with this invention, it has been found that compounds having a 300% modulus of 12–18 MPa and a minimum tensile strength of 23 MPa as tested per ASTM D412, and a T90 of between 30 and 40 minutes at a reference temperature of 135 degrees C. as tested per ASTM D2084 are suitable for use in this invention.

DEFINITIONS

As used herein and in the claims, the terms

"axial" and "axially" refer to directions which are parallel to the axis of rotation of a tire, "radial" and "radially" refer to directions that are perpendicular to the axis of rotation of a tire, "bead" refers to that part of a tire comprising an annular tensile member wrapped by ply cords and shaped, with or without other reinforcement elements to fit a designed tire rim, "apex" refers to a wedge of elastomeric material placed beside (radially above the bead) the bead which supports the bead area and minimizes flexing in the bead area, "carcass" refers to the tire structure apart from the belt structure, tread, undertread, and sidewall rubber but including the beads, (carcass plies are wrapped around the beads), "flipper" refers to additional reinforcement (usually fabric) that is placed around the bead/apex and, usually, between the bead/apex and the carcass ply, "equatorial plane" refers to a plane that is perpendicular to the axis of rotation of a tire and passes through the center of the tire's tread, "breaker plies" refers to annular reinforcement members in the crown area of the tire having longitudinal reinforcement members having an angle (in the illustrated embodiment) with respect to the equatorial plane of the tire of about 50° less than the angle of such reinforcement members in the (bias) carcass plies, "crown" refers to substantially the outer circumference of a tire where the tread is disposed, "tenacity" refers to stress expressed as force per unit linear density of an unstrained specimen (gm/tex or gm/denier), (usually used in textiles), and "modulus" refers to the ratio of the change in stress to the change in strain.

DETAILED DESCRIPTION OF THE INVENTION

Rubber compounds that are used in polyester reinforced passenger tires do not have to endure the high temperatures encountered by aircraft tires and accordingly are not suitable for use in aircraft tires. Rubber compounds most frequently used in aircraft tires can endure high temperatures but do not show good adhesion to high modulus reinforcement materials that melt at high temperatures and are resistant to flatspotting, such as polyesters. If high modulus reinforcement materials can be made suitable for use in aircraft tires, it is possible that lighter aircraft tires can be made because it should take fewer plies to obtain the strength needed for such tires. It has been found that certain prior art compounds that are stable at high temperatures and show good abrasion and durability properties also show good adhesion to polyesters, and may be useful with polyesters and other high modulus materials to build light weight, durable aircraft tires that are resistant to flatspotting.

In accordance with this invention, it has been found that compounds having a 300% modulus of 12–18 MPa and a minimum tensile strength of 23 MPa as tested per ASTM D412, and a T90 of between 30 and 40 minutes at a reference temperature of 135 degrees C. as tested per ASTM D2084 are suitable for use in this invention.

Exemplary of rubber compounds that can be used in the invention are compounds having the following composition. Ingredients are listed in parts by weight. The final compound contains no free amines.

| | |
|---|---|
| Natural Rubber | 100 |
| Carbon Black | 40–60 |
| Processing oil | 3–10 |
| Fatty Acid | 1–3 |
| Zinc Oxide | 3–8 |
| Sulfur | 0.5–2.5 |
| accelerator | 1–3 |
| Adhesion promoter | 1–7 |

Examples of adhesion promoters are resorcinol, hexamethylenetetramine, hexamethoxymethylmelamine and reactive phenol-formaldehyde resin.

The accelerator may be selected from non amine generating accelerators such as sulfenamide accelerators or benzothiazole accelerators. Other suitable accelerators may be apparent to those skilled in the art.

Non-amine generating accelerators are preferred since it has been found that the presence of free amines in the compound causes chemical reactions with polyesters and possibly other high modulus reinforcing materials, and such reaction may cause break down of the high modulus reinforcement used to make the aircraft tire of the invention. Amine generating accelerators may be used if process steps are used to make sure no free amines remain after mixing of the rubber composition.

Figure 1:
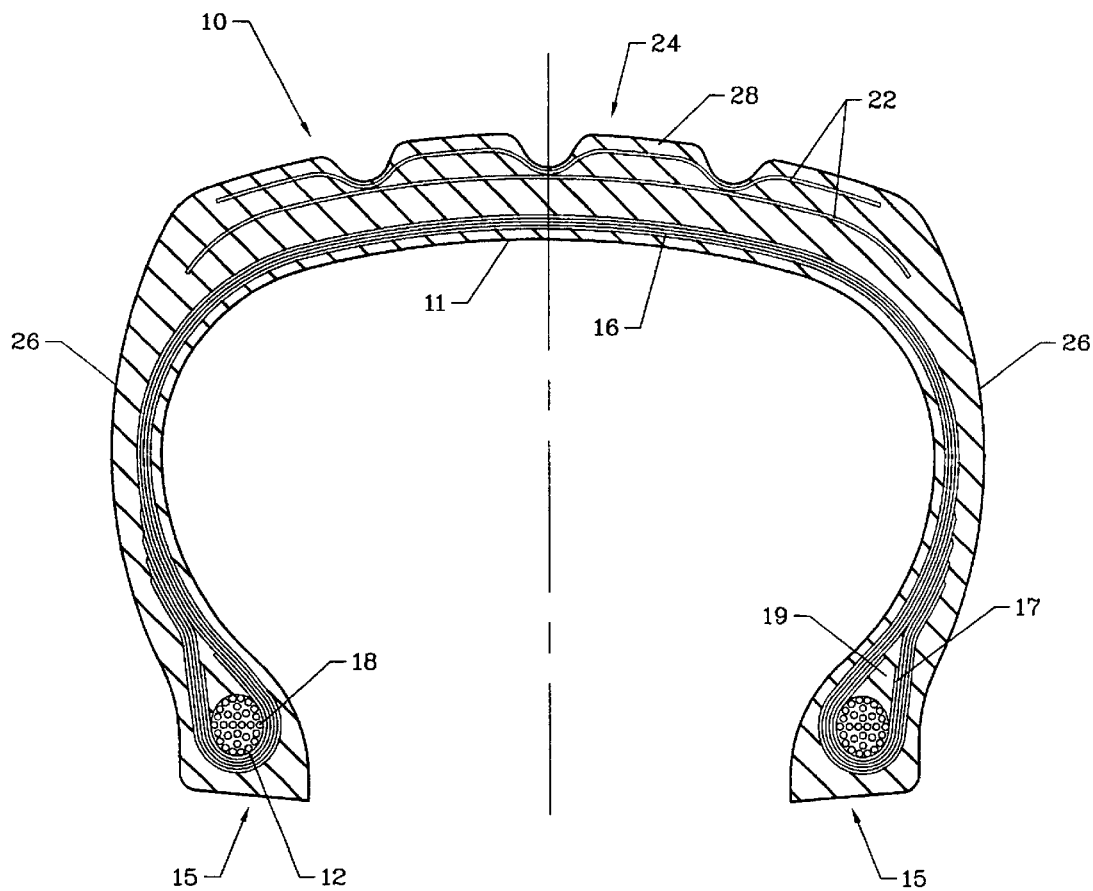
FIG. 1 is a cross-sectional view of a tire according to one embodiment of the invention taken in a plane that contains the axis of rotation of the tire.

With reference now to FIG. 1, in an illustrated embodiment of the invention, a pneumatic aircraft tire 10 comprises a pair of parallel annular beads 12, carcass plies 16 wrapped around beads 12, belts or breakers 22 disposed radially above the carcass plies 16 in a crown area 24 of the tire, inner liner 11 disposed radially inward of the carcass plies, and tread 28 disposed radially above the belts/breakers 22 (in the crown area 24 of the tire), and sidewalls 26 disposed between tread 28 and bead area 15 of the tire 10.

The carcass plies and breaker plies, as is common in the art, are reinforced with substantially parallel longitudinal reinforcing members. Although it is believed that the rubber formulations described above can also be used with high modulus reinforcement in radial ply aircraft tires, in the illustrated embodiment, the tires are bias ply pneumatic tires which have bias carcass plies and/or breaker plies which are reinforced by reinforcement cords made of polyester. Examples of polyesters that can be used are polethylene terephthalate and polyethylene napthalate, and mixtures thereof.

High modulus reinforcement cords useful in the invention will have, in general, a tenacity of 6.6 to 8.2 g/d (grams per denier), an initial modulus of 120 to 280 g/d, an elongation at break of 8 to 18% and a shrinkage of 0.5 to 3.0%.

In the illustrated embodiment, polyethylene terephthalate (PET) carcass reinforcement cords were used. PET cords of the type used, 1500/1/2 with a twist of 8.5×8.5 demonstrate, in general, a tenacity of 6.5 to 7 g/d, an elongation at break of 14 to 20%, a shrinkage of 1.5 to 1.8% and an initial modulus of 120 to 180 g/d. Such polyester cords are available from Akzo Nobel, AlliedSignal, Hoechst Celanese, Teijin, Toyobo and Kolon.

The specific cord used in the illustrated embodiment was Hoechst Celanese Trevira 792 polyester having a tenacity of 6.9 g/d, an elongation at break of 14.8%, a shrinkage of 1.7% and an initial modulus of 140 g/d.

Figure 2:
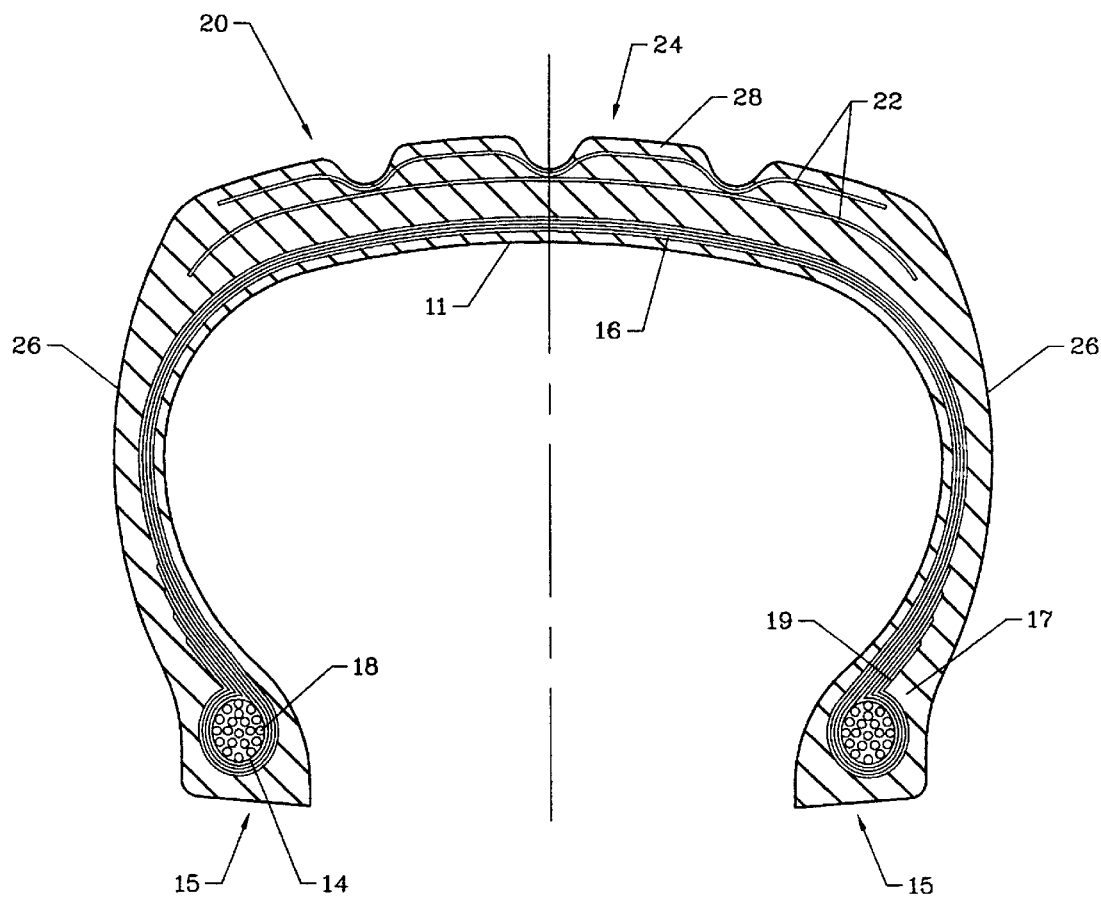
FIG. 2 is a cross-sectional view of a prior art tire made for use on the same type of aircraft as the tire of the invention.

FIG. 2 illustrates a prior art tire 20 designed for use on the same type of aircraft as the illustrated tire of the invention. It is apparent that the prior art tire 20 is constructed without an apex or a flipper, and the bead 14 comprises a four wire 18 by five wire 18 construction. When a tire using this prior art design was constructed using polyester carcass plies made according to this invention, the tire failed during a taxi test because of cord failure just above the bead of the tire. The tire failed apparently because the high modulus polyester cords are brittle compared to nylon cords, and fatigue in the bead area of the tire shredded the cords in the flex area of the sidewall.

Even though the polyester cords in the prior art tire design failed due to fatigue, the polyester cords showed good adhesion to the high temperature resistant compounds used in the construction of the tire, and this appeared to confirm the effectiveness of the high temperature, polyester compatible compounds used in the tire construction.

Figure 3:
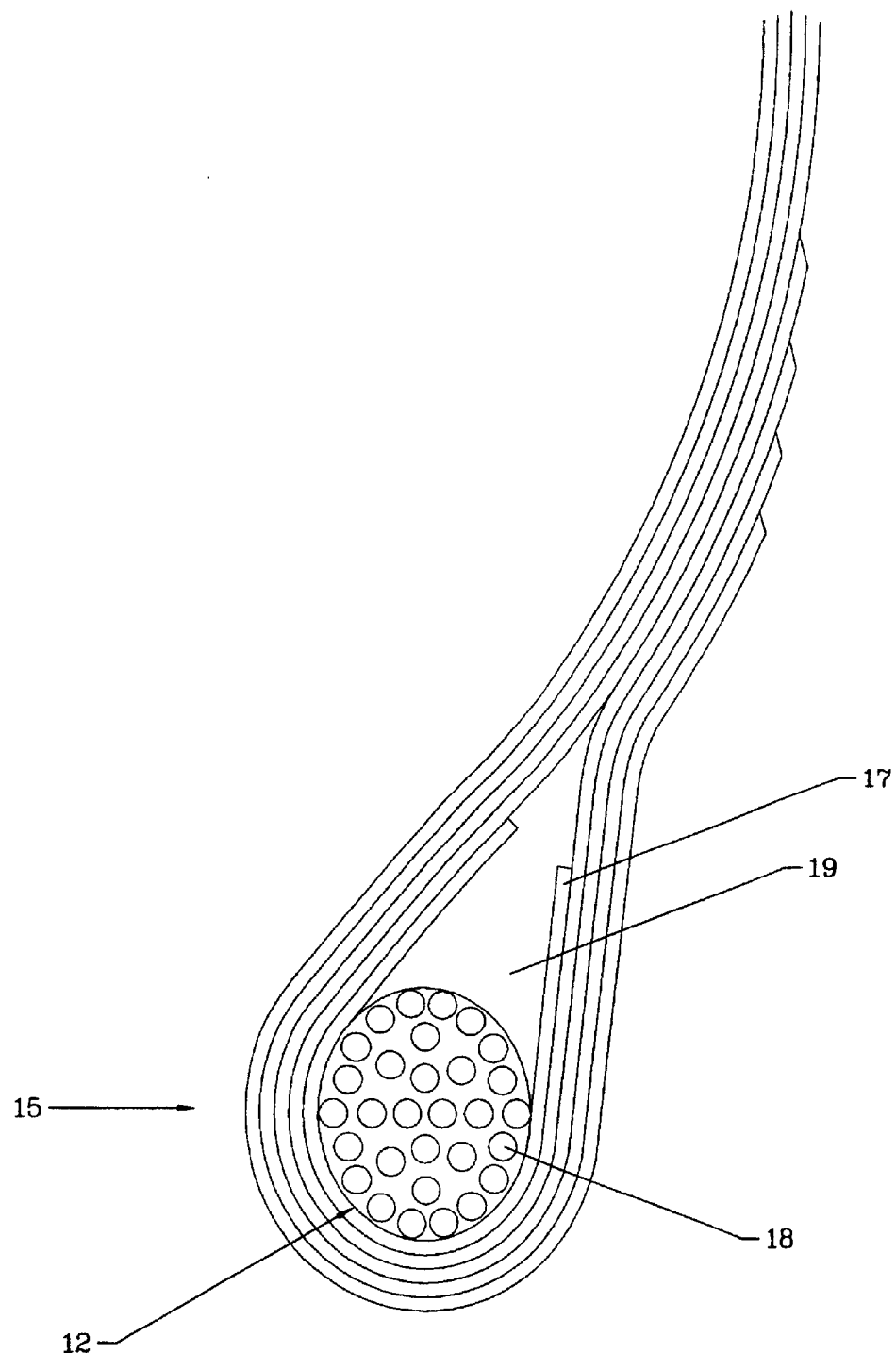
FIG. 3 is an enlarged view of the bead area of the tire of the invention.

With reference now to FIGS. 1 and 3, in an effort to relocate the stresses in the tire 10 away from the bead area 15 of the tire, it was proposed to stiffen the bead area 15 of the tire by making the bead 12 larger as compared to the bead 14 of the prior art tire 20 by using a five wire 18 by six wire 18 bead construction, instead of the prior art four wire by five wire construction, and by adding flipper 17 and apex 19 to the tire design. The larger bead and the extra bead area 15 stiffness caused by flipper 17 and apex 19 moves the flex area of the sidewall away from the bead.

Figure 4:
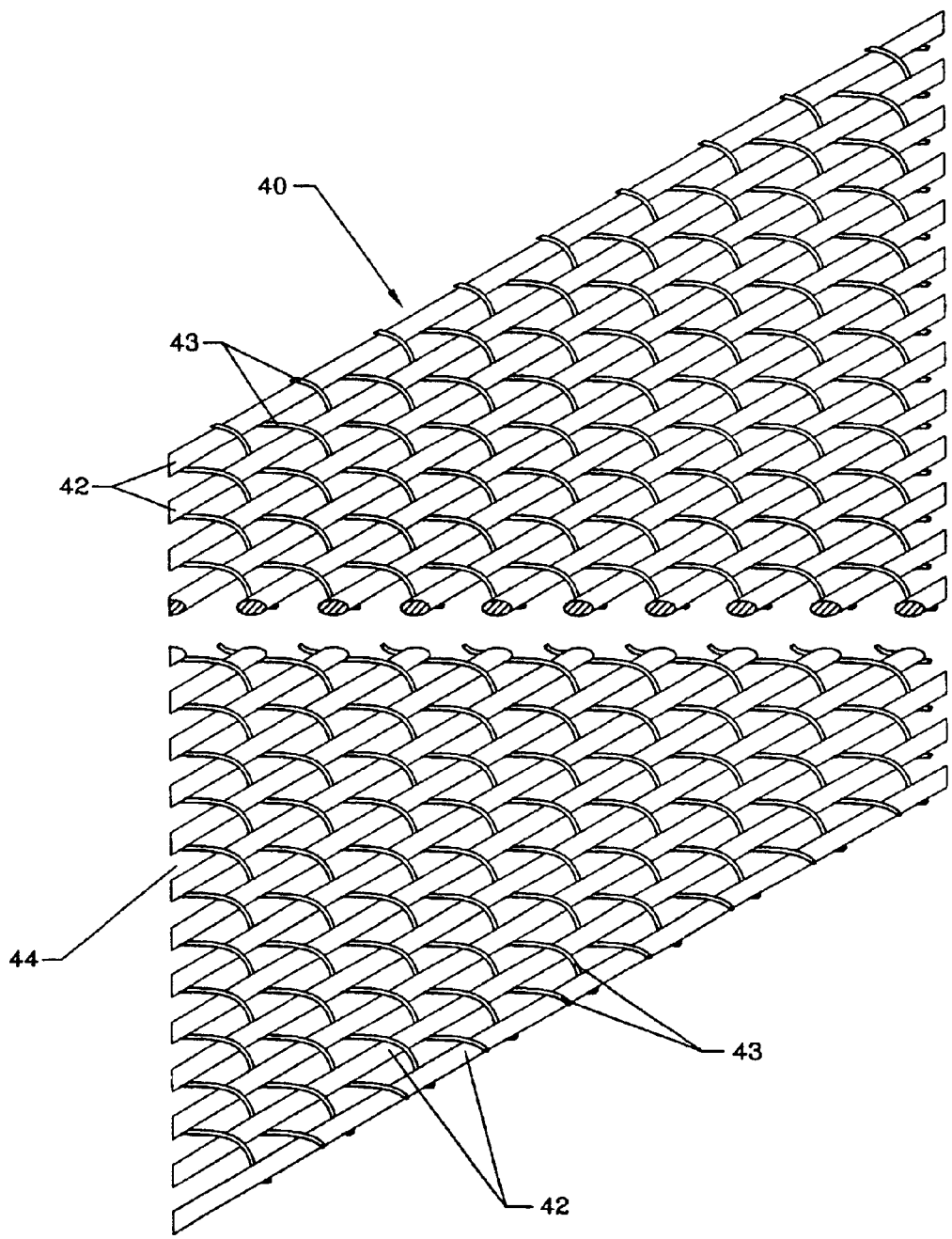
FIG. 4 illustrates a portion of a reinforcing ply.

With reference to FIG. 4, the illustrated plies 40 of the invention are made by incorporating parallel high modulus reinforcement cords 42 in an elastomeric matrix 44. In a preferred embodiment, the parallel reinforcement cords are held in position relative to one another while being calendered into the rubber matrix by pic cords 43 designed specifically to divert gases away from the reinforcement cords, by absorbing the gases, or bleeding the gases and possibly diverting the gases out of the rubber matrix. For example, Thermax® pic cords 43, as described in U.S. Pat. No. 5,221,382, said patent being incorporated herein by reference, serve to help vent gases from the tire while it is being cured, which together with the use of rubber compounds which are compatible with high modulus cords, may help prevent separation of high modulus reinforcement cords in a tire from their rubber matrix.

Those skilled in the art will recognize that a similar ply can be used in tires employing two, three or four pairs of tire beads.

The tire construction shown in FIG. 1, made using plies comprising 1500/2 denier PET reinforcement cords with a twist of 8.5×8.5 and 28 e.p.i. (ends per inch) performed acceptably on the taxi test and burst test and completed FAA testing requirements.

In an illustrated embodiment, it has been determined that tires having good burst properties and durability can be constructed using carcass plies which comprise polyester reinforcement in a concentration of about 8–32 e.p.i. depending on the size of the polyester cords used. Breaker or belt plies using reinforcement in a concentration of about 6–28 e.p.i., preferably 8–20 e.p.i., may also contribute to the burst strength, durability and lateral stability of a tire. It is believed that tires made according to the invention also demonstrate excellent dimensional stability and low heat generation.

In a bias ply tire 10 of-the invention, the carcass bias ply is wrapped over beads 12 such that polyester cords 42 have an angle of 30° to 55°, preferably 40° to 50° with respect to the equatorial plane of the tire. By definition, the reinforcement members in breaker plies have an angle at least 5° less than the angle of the reinforcement members in the carcass plies, and accordingly, the reinforcement members in the breaker plies have an angle of 25° to 50°, preferably 35° to 45°, with respect to the equatorial plane of the tire.

In the illustrated embodiment of the invention, both the bias plies and the breaker plies have been reinforced with polyester cords as described herein. Those skilled in the art will recognize, however, that tires may be made according to the invention wherein bias carcass plies are reinforced with polyester cords (to allow production of a tire with reduced weight) while the breaker plies are reinforced with steel, or other types of high modulus reinforcement (to provide increased strength or other desirable properties). Other alternative arrangements of the plies described herein will be apparent to those skilled in the art.

The invention is further illustrated with reference to the following examples.

EXAMPLE 1

An aircraft tire size 6.00–66PR (ply rating) having PET carcass reinforcement at 14–15 e.p.i. and bias carcass angles of 46 to 49 degrees was subjected to FAA TSO Qualification and additional Goodyear testing with the following results.

The tire completed the dynamic requirements after 61 cycles, but separations occurred. The test was not continued to determine whether diffusion requirements were met. On the Goodyear durability test, the Progressive Taxi test, the tire completed 42 cycles, which is good for a large commercial tire, but low for what is expected for the tire of the example. The tire burst at 440 psi (pounds per square inch), where the minimum requirement is 220 psi.

The FAA TSO Qualification test comprises 50 takeoff cycles, 8 taxi cycles, two 120% load taxi cycles and one 150% load take off cycle for a total of 61 cycles. The diffusion test involves measuring inflation pressure after the test, and the tire passes if it does not lose more than 10% of its initial inflation pressure 24 hours after the initial inflation.

The Goodyear Progressive Taxi test comprises running taxi tests at successively longer distances until the tire fails or 100 cycles are completed.

CONCLUSIONS

Although the tire of the invention did not test at the level desired for commercialization, the tests showed the viability of the concept and with further modification full ratification and commercialization is expected.

While specific embodiments of the invention have been illustrated and described, those skilled in the art will recognize that the invention may be variously modified and practiced. The invention is limited only by the following claims.

What is claimed is:

1. A pneumatic aircraft tire (10) comprising:
   (a) at least a pair of axially spaced inextensible beads (12),
   (b) carcass plies (16) wrapped over said beads (12),
   (c) breaker plies (22) disposed radially outward of the carcass plies (16) in a crown portion (24) of said tire (10),
   wherein said carcass plies (16) and said breaker plies (22) comprise substantially parallel high modulus polyester cords (42) imbedded in a rubber compound (44) having the formula

| | |
|---|---|
| Rubber | 100 |
| Carbon Black | 40–60 |
| Processing oil | 3–10 |
| Fatty Acid | 1–3 |
| Zinc Oxide | 3–8 |
| Sulfur | 0.5–2.5 |
| accelerator | 1–3 |
| Adhesion promoter | 1–7 | wherein ingredients are listed in parts by weight per hundred parts by weight rubber, wherein adhesion promoters for the rubber compound therein are selected from the group consisting of resorcinol, hexamethylenetetramine, hexamethoxymethylmelamine and reactive phenol-formaldehyde resin and said accelerator is non-amine generating and is selected from the group consisting of sulfenamide accelerators and benzothiazole accelerators and characterized in that said compound contains no free amines, and wherein: said rubber compound (44) has a 300% modulus of 12–18 MPa and a minimum tensile strength of 23 MPa as tested per ASTM D412, and a T90 of between 30 and 40 minutes at a reference temperature of 135 degrees C. as tested per ASTM D2084.

2. The tire (10) according to claim 1 wherein said high modulus polyester cords (42) are about 1500/2 denier and have a tenacity of 6.6 to 8.2 g/denier, an initial modulus of 120 to 280 g/denier, an elongation at break of 8 to 18% and a shrinkage of not greater than 3%.

3. The tire according to claim 1 wherein the high modulus polyester cords (42) of said breaker plies (22) are embedded in said rubber compound (44) at an end count of 6 to 28 e.p.i.

4. The tire (10) of claim 1 wherein said high modulus polyester cords (42) are selected from the group consisting of PET and PEN and mixtures thereof.

5. The pneumatic tire (10) of claim 1 which is a bias ply tire wherein turn-up and turn-down carcass plies (16) comprise side-by-side polyester cords (42) having a tenacity of 6.5 to 7 g/denier, an initial modulus of 120 to 180 g/denier and a shrinkage of not greater than 3% and hiving an elongation at break of 14 to 20%.

6. The bias ply tire (10) according to claim 5 wherein said polyester cords (42) are 1500/2 denier and have a tenacity of about 6.9 g/denier, an initial modulus of about 140 g/denier, an elongation at break of about 14.8% and a shrinkage of about 1.7%.

7. The bias ply tire (10) according to claim 5 wherein the polyester cords (42) of said turn-up and turn-down carcass plies (16) are oriented at 30° to 55° with respect to an equatorial plane of the tire.

8. The bias ply tire (10) according to claim 7 wherein the polyester cords (42) of said breaker plies (22) are oriented at 20° to 45° with respect to an equatorial plane of the tire.

* * * * *